Figure 1:
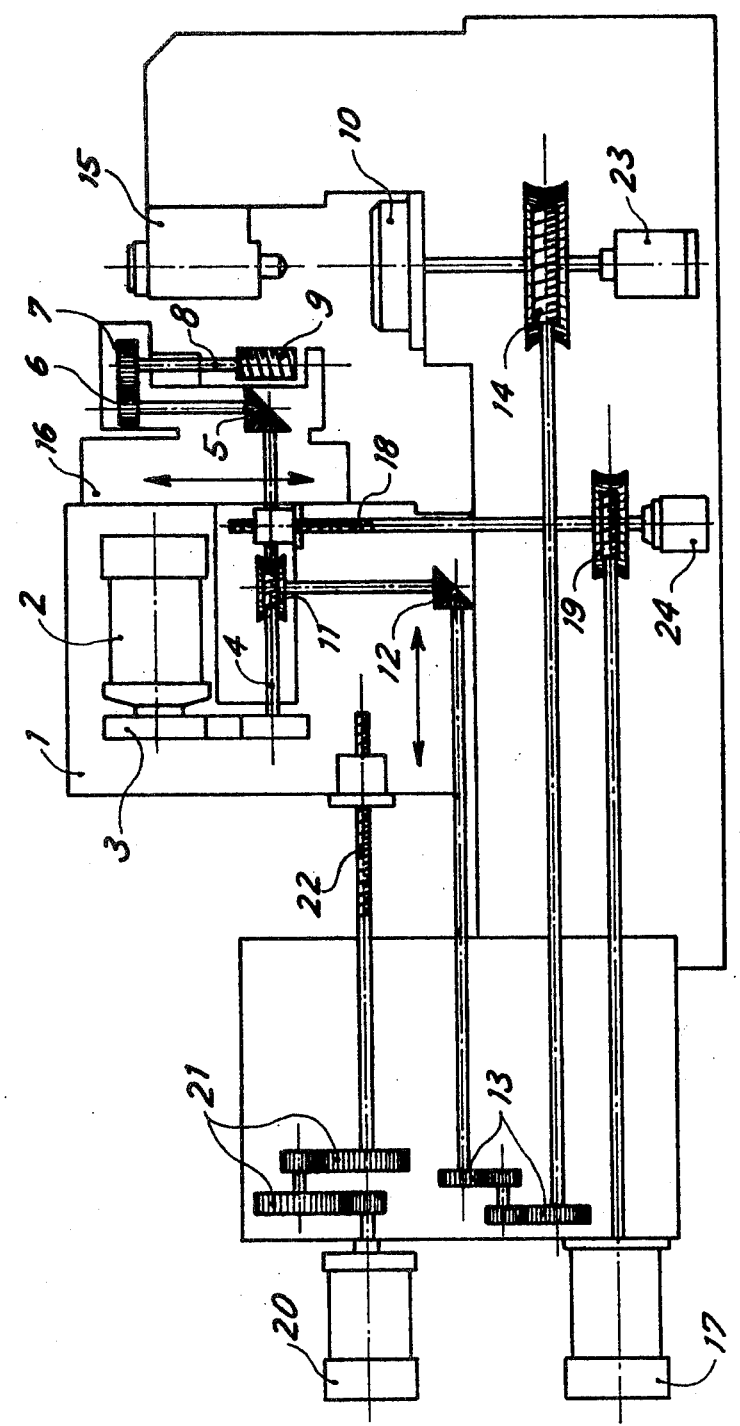

United States Patent [19]

Sabbioni

[11] 4,208,155
[45] Jun. 17, 1980

[54] GEAR CUTTING MACHINE WITH A HOB

[75] Inventor: Cesare Sabbioni, Bologna, Italy

[73] Assignee: CIMA S.p.A. di C. Sabbioni & C., Bologna, Italy

[21] Appl. No.: 941,862

[22] Filed: Sep. 13, 1978

[30] Foreign Application Priority Data

Sep. 19, 1977 [IT] Italy ................. 27672 A/77

[51] Int. Cl.² ............................................. B23F 3/00
[52] U.S. Cl. .................................. 409/3; 51/105 HB; 409/15
[58] Field of Search ............... 90/2, 4; 51/105 HB, 51/DIG. 1; 409/2, 3, 15

[56] References Cited

U.S. PATENT DOCUMENTS

| | | | |
|---|---|---|---|
| 1,807,665 | 6/1931 | Miller | 51/105 HB |
| 2,374,258 | 4/1945 | Davenport | 51/105 AB X |
| 3,152,422 | 10/1964 | Loxham | 409/2 X |
| 3,204,532 | 9/1965 | Budnick | 409/15 X |
| 3,254,566 | 6/1966 | Bradner | 409/2 |
| 3,267,344 | 8/1966 | McDaniel | 409/15 X |
| 3,813,988 | 6/1974 | Hodgson | 90/2 |
| 3,841,198 | 10/1974 | Cornford | 409/15 X |

FOREIGN PATENT DOCUMENTS

| | | | |
|---|---|---|---|
| 361960 | 6/1962 | Switzerland | 90/2 |
| 131899 | 5/1961 | U.S.S.R. | 409/2 |
| 155081 | 2/1962 | U.S.S.R. | 90/2 |
| 200394 | 10/1967 | U.S.S.R. | 51/105 HB |
| 227608 | 9/1968 | U.S.S.R. | 409/15 |
| 258824 | 4/1970 | U.S.S.R. | 90/2 |
| 581369 | 11/1977 | U.S.S.R. | 409/15 |

Primary Examiner—William R. Briggs
Attorney, Agent, or Firm—Kurt Kelman

[57] ABSTRACT

Gear cutting apparatus comprises a hob 9 carried by a radial slide 1 and an axial slide 16, which are moved by independent d.c. motors 20 and 17. A main variable-speed motor 2 on the radial slide 1 is kinematically connected to the hob 9 and to a turntable 10 for the workpiece. The speed of movement of the axial slide is controlled by an electronic circuit which receives signals from dynamo-tachometers kinematically connected respectively to the turntable 10 and to the motor 17 moving the axial slide 16. The movement of the radial slide 1 is controlled in accordance with that of the axial slide 16 by another electronic circuit.

5 Claims, 3 Drawing Figures

GEAR CUTTING MACHINE WITH A HOB

The present invention relates to a gear-cutting machine with a hob, improved is such a way as to have the vertical and horizontal feed movements of the hob independent from that of the workpiece to be cut in order to achieve greater versatility of use and more particularly to make it possible to vary the speed of the shaft mounting the hob according to the requirements arising from the type and characteristics of the workpiece to be cut.

As is well known, in gear-cutting machines with hobs (hobbing cutters) the vertical or axial feed motion of the shaft mounting the hob relatively to the workpiece placed upon a turntable is usually obtained by means of suitable gearing directly from the main motor, which also drives, through other gearings, the workpiece to be cut. These kinematic chains for the transfer of motion become very complex in practice; yet they form a rigid system at constant speed, inasmuch as it is generally achieved by means of mechanical gears and only by special elaboration is it possible to introduce mechanical speed-change gearing, which apart from being very expensive, is also slow and of low reliability. Moreover, such rigid kinematic chains do not allow, save by highly sophisticated modifications that are seldom acceptable, one to work the workpiece in two traverses, especially with the rough traverse in one direction and the finishing traverse in the opposite direction. Finally, with such conventional machines it is not possible to obtain modulations and/or steps of the feed speed where such speed variation would be desirable in the case of cutting special gears, such as, for instance, in equispaced sets, let alone at the beginning and the end of the cutting of each gear or of each set of wheels.

The present invention is, therefore, concerned with improving a gear-cutting machine, by means of separating the vertical and horizontal feed movements of the hobbing screw from that of the turntable carrying the workpiece, by introducing supplementary motors with suitable servo systems, so as to allow control of the speed of the driving shaft mounting the hob increased speeds, and changes of the working direction, which with the present kinematic systems is in practice very difficult and expensive in a single embodiment. It would be desirable to allow vertical feed of the hob that is proportional to the number of revolutions of the turntable carrying the workpiece, with the advantage of ensuring the constancy of the feed and working. It would also be desired to provide a gear-cutting machine capable of making the speed at which the material is conveyed different for the rough working traverse from that of the finishing traverse, as well as being capable of producing gears with special teeth, such as, for instance, convex and concave teeth.

The present invention provides a gear-cutting apparatus with a hob which provides the separation of the coupling kinematic chain between the main motor and the vertical and horizontal feed shafts of the hob, as well as the introduction of independently operated electromechanical and electronic means. More particularly the gear-cutting machine comprises in combination:

a radially movable slide for bringing the hob to the workpiece, driven by its own motor through a suitable reduction gear;

a main motor, mounted on the radial slide, adapted to drive, through a speed change and suitable gears, the shaft carrying the hob which is mounted upon a slide (carriage) for vertical or axial motion and inclinable in the vertical plane, and, through a conventional kinematic chain, the turntable carrying the workpiece;

a further motor, kinematiclly connected to the threaded spindle provided for the vertical movement of the slide carrying the hob which enables the hob to move vertically independently of the number of revolutions of the turntable with the workpiece;

two dynamo-tachometers connected respectively to the turntable carrying the workpiece and the driving shaft for the vertical motion of the hob, adapted to emit at exit a suitable signal, which is proportional to the respective speeds of rotation;

an electronic circuit, which includes an analogue multiplier-divider means for the signal emitted by the dynamo-tachometer connected to the turntable with a signal emitted by a sensor-transducer that follows a template of predetermined profile and corresponding to the speed changes required by the type of operation, the signal in the output of said multiplier-divider being then confronted with that emitted by said second dynamo-tachometer so as to obtain a signal, which upon amplification is passed on to the said motor driving the vertical shaft, in order to obtain feed speeds of the hob that are proportional to the travels required by the cutting, and, in particular, for cutting gears with convex teeth or helical gears;

an electronic circuit serving to ensure that the horizontal movements of the radial slide fit the outline of the tooth to be obtained, the said circuit comprising a template integral with the radial slide and having a profiled course conjugated to that of the tooth to be obtained, and a transducer-sensor which is integral with the slide carrying the hob and adapted to follow this course in the advance of the hob, the signal emitted by the said sensor while it moves in contact with the said profile being compared to the signal emitted by a transducer integral with the radial slide and preventively screened so as to obtain in output a continuously variable signal, which, on being fed into the motor for the horizontal motion of the radial slide, ensures the radial travels of the hob required by the outline of the tooth to be cut.

An electronic circuit utilising two dynamo-tachometers is applicable also to the motor for the radial motion of the hob, in order to obtain speeds of radial travel of the hob that are proportional to the number of revolutions of the turntable, there being in this case a dynamo-tachometer connected to the motor for the radial motion of the hob.

Figure 2:
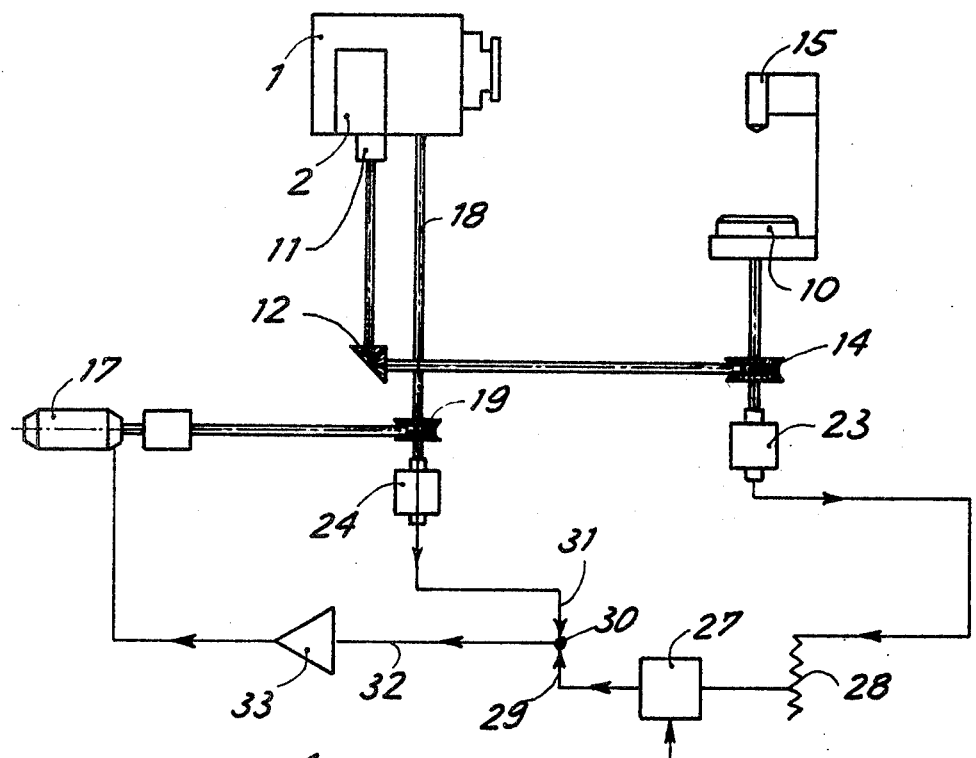
Figure 3:
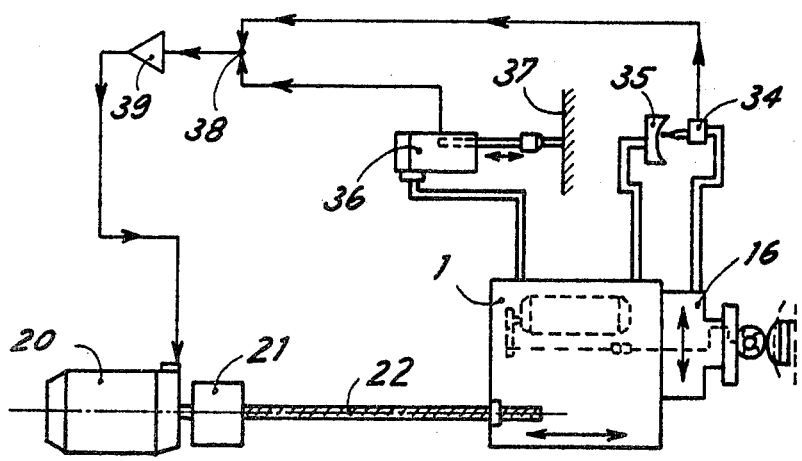

The invention will now be described further with reference to the accompanying drawings, given solely by way of example, wherein:

FIG. 1 diagrammatically shows a gear-cutting apparatus, with special reference to its kinematic chains;

FIG. 2 is a block diagram of an electronic circuit ensuring that the feed speeds of the hob shall be proportional to the speeds required by the type of operation; and FIG. 3 is a simplified block diagram of an electronic circuit adapted to ensure the automatic cutting of convex and like teeth.

The gear-cutting machine illustrated provides for the separation of the vertical and horizontal feed movements of the hob from that which sets in rotation the turntable with the workpiece. A slide 1 is mounted to be movable horizontally and radially relative to the workpiece, and carries a main, preferably variable-speed, motor 2, which through a speed-change gear 3 transmits motion to a shaft 4. The shaft 4 transmits the motion, through a cone coupling 5 and gears 6 and 7, to a shaft 8 on which the hob 9 is keyed. The shaft 4 also drives a turntable 10 through a kinematic chain, similar to those of the conventional machines, consisting of gear couples 11, 12, 13, and 14. The usual counter-bearing 15 for blocking the workpiece is rigidly mounted upon the turntable.

The hob 9 is carried by a slide 16 (as in conventional machines), which is vertically movable in recessed guides in the radial slide 1, and the vertical (axial) translation movement (forward feed movement of the hob) is imparted by an independent d.c. motor 17 which drives via gears 19 a vertical threaded spindle 18, and thence the slide 16 carrying the hob 9. Thus, the movement of the vertical spindle 18 and so the vertical travel of the hob 9 are made independent from the main motor 2.

To enable the hob 9 to move horizontally, i.e. radially in relation to the workpiece, the slide 1 is movable concurrently in guides by means of a separate d.c. motor 20 which, through the usual gearing 21 and the threaded spindle 22, effects the radial displacements of the slides 1 and 16, and so makes it possible to cut gears of any particular kind, including convex teeth and helicoidal gears (as will be particularly explained later on), by effecting radial feed motion.

For improving the performance of the machine and more particularly for controlling the forward feed of the hob in relation to the required removal of material per revolution of the turntable (for example, removal in millimeters per revolution of the turntable), the apparatus comprises (FIG. 2) an electronic circuit consisting of a reference dynamo-tachometer 23, keyed on the shaft of the turntable 10, a second dynamo-tachometer 24, keyed on the spindle 18 (or on the shaft of the motor 17 which drives it), a stationary template 25 with a profile predetermined in relation to the changes of speed required by the type of working, the profile being followed by a sensor 26, which moves with the vertical progress of the hob, and an analog multiplier-divider 27. The signal emitted by the dynamo-tachometer 23 is fed into a control potentiometer 28 and thence to the multiplier 27, which also receives the variable signal emitted by the sensor 26. The output signal 29 is controlled in amplitude in a comparator circuit 30 by the signal 31 emitted by the dynamo-tachometer 24. If the signals 29 and 31 that confront each other are equal to each other and of oposite sign no error signal will be emitted at the output 32, and hence the motor of the vertical shaft 18 will rotate at the blocked speed without affecting the forward speed of the hobbing screw: if, on the other hand, the resulting error signal at the output 32 shows a difference, this signal, after being amplified in the amplifier 33, is fed into the motor 17, which will alter in proportion to the forward feed speed of the hob until the signals 29 and 31 become equal and of opposite sign. The template 25 and the corresponding sensor 26 may be absent or unused, in which case the multiplier-divider 27 is also omitted and the signals arriving directly from the two dynamo-tachometers 23, 24 are compared in the circuit 30.

By means of the above-described electronic circuit (FIG. 2) it is possible to obtain automatically increases and decreases in the imparted speed according to the position of the hob relative to the workpiece, as well as forward movements that are always proportional to the cutting requirements and to the revolutions of the turntable carrying the workpiece.

In order to carry out the cutting of, for instance, convex teeth or toothed rims with concave helicoidal teeth, for which it is necessary to move the hobbing screw also radially (away and towards the revolving workpiece), the apparatus comprises an electronic circuit (FIG. 3) which consists of a sensor 34, fixed on the vertical slow-motion slide 16 and placed in contact with a template 35, having a course profile opposite to that of the tooth to be obtained (e.g. a concave profile if convex teeth are to be cut), fixed on the radial slide 1. The circuit further comprises a transducer 36, which is fixed to the radial slide, having a sensor in contact with a fixed part 37 of the machine; the signal emitted by the sensor 34 and the signal emitted by the transducer 36 are compared in a comparator circuit 38, and the signal emitted by it is passed on, after amplification in an amplifier 39, to the motor 20 which operates the radial displacements of the slide 1. At the starting phase the sensor 34 is applied to one end of the template 35 and the transducer 36 is set at zero; as soon as the slide 16 begins to move forward, the sensor 24 emits a signal which varies continuously according to the depth of the profile of the template 35, whereby this signal, compared in the circuit 38 with that emitted by the transducer 36, will yield at the output of the circuit 38 a difference or error signal, which will actuate the motor 20 and so will continue to displace radially the slide 1, not stopping it until the signal emitted by the transducer 36 is changed (as a result of the movement of the slide 1) sufficiently to yield equality with opposite signs of the two signals applied to the comparator circuit 38.

In the case where a helicoidal gear is cut, the template 35 has a profile corresponding to the horizontal travels necessitated by the fact that the gear to be cut has concave teeth. Furthermore, in practice, the positions of the template 35 and of the sensor 34 may be exchanged; thus the apparatus described above may be subject to other structurally and functionally equivalent modification and variation without thereby exceeding the scope of the invention as defined in the appended claims.

I claim:

1. Gear cutting apparatus comprising: a turntable for carrying a workpiece; a slide movable radially with respect to the turntable; a motor kinematically connected to the radially movable slide; a slide movable axially with respect to the turntable and carried by the radially movable slide; a motor kinematically connected to the axially movable slide; a hob mounted on the axially movable slide; a main motor mounted on the radially movable slide, the main motor being kinematically connected to the hob and to the turntable; a first dynamo-tachometer kinematically connected to the turntable; a second dynamo-tachometer kinematically connected to the motor which moves the axially movable slide; a first electronic control circuit for controlling the speed of movement of the axially movable slide, the first control circuit comprising a template having a predetermined profile, a sensor which follows the said profile, one of said template and sensor being fixed and the other moving with the axially movable slide, an analog multiplier-divider which receives signals from the first dynamo-tachometer and the sensor, and a comparator which receives signals from the multiplier-divider and the second dynamo-tachometer and which transmits an error signal to the motor which moves the axially movable slide; and a second electronic control circuit for controlling the movement of the radially movable slide in accordance with that of the axially movable slide, the second control circuit comprising a template having a predetermined profile, a sensor which follows the said profile of the template of the second circuit, one of said template and sensor of the second circuit moving with the radially movable slide, the other moving with the axially movable slide, a transducer for detecting the position of the radially movable slide, and a comparator which receives signals from the sensor of the second circuit and the transducer and which transmits an error signal to the motor which moves the radially movable slide.

2. Apparatus as claimed in claim 1, in which the motors which move the slides are d.c. motors.

3. Apparatus as claimed in claim 1, in which the main motor is a variable-speed motor.

4. Apparatus as claimed in claim 1, in which the first electronic circuit includes a control potentiometer via which the signal from the first dynamo-tachometer is transmitted to the multiplier-divider.

5. Apparatus as claimed in claim 1, including a third dynamo-tachometer kinematically connected to the motor which moves the radially movable slide, and a third electronic control circuit for moving the radially movable slide at a speed proportional to that of the turntable, the third control circuit comprising a comparator which receives signals from the first and third dynamo-tachometers and which transmits an error signal to the motor which moves the radially movable slide.

* * * * *